US010020961B2

(12) United States Patent
Byun (10) Patent No.: US 10,020,961 B2
(45) Date of Patent: *Jul. 10, 2018

(54) METHOD AND APPARATUS FOR NETWORK VIRTUALIZATION

(71) Applicant: ELECTRONICS AND TELECOMMUNICATIONS RESEARCH INSTITUTE, Daejeon (KR)

(72) Inventor: Sung Hyuk Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 571 days.

This patent is subject to a terminal disclaimer.

(21) Appl. No.: 14/583,303

(22) Filed: Dec. 26, 2014

(65) Prior Publication Data

US 2015/0188728 A1 Jul. 2, 2015

(30) Foreign Application Priority Data

Dec. 27, 2013 (KR) .................. 10-2013-0165299
Oct. 8, 2014 (KR) .................. 10-2014-0136067

(51) Int. Cl.
*H04L 12/28* (2006.01)
*H04L 12/46* (2006.01)
*H04L 12/721* (2013.01)

(52) U.S. Cl.
CPC .......... *H04L 12/4633* (2013.01); *H04L 45/66* (2013.01)

(58) Field of Classification Search
CPC .................. H04L 12/4633; H04L 45/66
See application file for complete search history.

(56) References Cited

U.S. PATENT DOCUMENTS

| 8,223,770 B2 | 7/2012 | Wray et al. |
| 9,686,180 B2 * | 6/2017 | Chu .................. H04L 45/28 |
| 2010/0208615 A1 * | 8/2010 | Soon .................. H04L 12/462 370/254 |
| 2010/0309894 A1 * | 12/2010 | Csaszar .............. H04L 12/4641 370/338 |
| 2013/0294231 A1 | 11/2013 | Nodir et al. |
| 2013/0343385 A1 | 12/2013 | Benny et al. |

(Continued)

FOREIGN PATENT DOCUMENTS

KR    1020130126833 A    11/2013

*Primary Examiner* — Clemence Han
(74) *Attorney, Agent, or Firm* — Ladas & Parry LLP (57) ABSTRACT

Provided herein a network virtualization apparatus and method, the apparatus including a tunnel manager configured to collect tunnel end points information within a network, and to connect each tunnel end point with a tunnel based on the tunnel end point information collected; a tunnel packet end point configured to receive a tunnel packet and process the packet such that an L2 switching may be performed, and to transmit the packet to a domain VSI (virtual switching instance); the domain VSI configured to perform the L2 switching on the processed packet, and to transmit the packet to a tunnel packet generator; and the tunnel packet generator configured to add a tunnel header to the packet for which the L2 switching has been performed to generate a new tunnel packet, and to transmit the new tunnel packet.

13 Claims, 4 Drawing Sheets

(56) References Cited

U.S. PATENT DOCUMENTS

2014/0269702 A1\* 9/2014 Moreno ................. H04L 45/64
  370/390
2014/0355419 A1\* 12/2014 Pillai .................. H04L 41/0654
  370/225
2015/0100704 A1\* 4/2015 Davie .................... H04L 45/14
  709/238

\* cited by examiner

FIG. 1

FIG. 2A a) Edge TEP(E-TEP)-to-Edge TEP packet format

FIG. 2B b) Edge TEP-to-Domain TEP(D-TEP) packet format

FIG. 2C c) Domain TEP – to – Domain TEP packet format

FIG. 3

D-VSI = Domain Virtual Switching Instance
VNID = Virtual Network ID

E-VP : Edge Virtual Port
D-VP : Domain Virtual Port

FIG. 6B

E-VP : Edge Virtual Port
D-VP : Domain Virtual Port

METHOD AND APPARATUS FOR NETWORK VIRTUALIZATION

CROSS-REFERENCE TO RELATED APPLICATION

The present application claims priority to Korean patent application numbers 10-2013-0165299, filed on Dec. 27, 2013 and 10-2014-0136067, filed on Oct. 8, 2014, the entire disclosure of which is incorporated herein in its entirety by reference.

BACKGROUND

Field of Invention

Various embodiments of the present invention relate to a network, and more particularly, to a method and apparatus for multi-domain network virtualization.

Description of Related Art

Recent trends of IT (information technology) include server virtualization, VM (virtual machine)-based computing, concentration of IT resources on data center, and network virtualization. Network virtualization is a technology where a plurality of virtual networks may be created on a physical network when necessary and can be deleted. This technology may be utilized to configure a network between virtual machines. A generally used overlay-based virtual network is a L2 network that may be realized on top of a L3 network in an overlay method. In the overlay-based virtual network, tunneling may be performed that is attaching a L3 IP (internet protocol) header to a L2 Ethernet frame being transmitted between virtual machines.

Most representative overlay-based network virtualization includes a VXLAN (virtual extensible local area network) and NVGRE (network virtualization using generic routing encapsulation). In a VXLAN or NVGRE, a virtual L2 network may be created by connecting a tunnel between servers. For this purpose, a full-mesh tunnel must be set between TEPs (Tunnel End Points) being realized in a server or gateway. In order to set a full-mesh tunnel between N number of TEPs, N×(N−1) number of tunnels are needed. This restricts expandability, thereby causing a problem of restricting the size of the network (number of network nodes) where a VXLAN or NVGRE may be applied.

Specifically, the greater the N, the more complex the setting becomes, and due to the restriction on the number of tunnels that may be set in TEPs and the restriction on the number of tunnels that may be managed by one network virtualization manager, a network virtualization domain must be restricted to a certain size. For these reasons, one network virtualization domain may generally be restricted to one IDC (Internet Data Center). There is need for a virtual network existing over a plurality of IDCs located far from one another geographically, but it is not easy to provide these requirements with conventional network virtualization methods since they lack expandability.

SUMMARY

A first purpose of various embodiments of the present invention is to provide a method and apparatus capable of providing expandability in an overlay-based virtual network.

According to an embodiment of the present invention, there is provided a network virtualization apparatus including a tunnel manager configured to collect tunnel end point information within a network, and to connect each tunnel end point with a tunnel based on the tunnel end point information collected; a tunnel packet end point configured to receive a tunnel packet and process the packet such that an L2 switching may be performed, and to transmit the packet to a domain VSI (virtual switching instance); the domain VSI configured to perform the L2 switching on the processed packet, and to transmit the packet to a tunnel packet generator; and the tunnel packet generator configured to add a tunnel header to the packet for which the L2 switching has been performed to generate a new tunnel packet, and to transmit the new tunnel packet.

According to another embodiment of the present invention, there is provided an operating method of a network virtualization apparatus, the method including collecting tunnel end point information within a virtual network, and connecting each tunnel end point with a tunnel based on the tunnel end point information collected; receiving a tunnel packet and processing the packet such that a L2 switching may be performed; performing the L2 switching on the processed packet; and adding a tunnel header to the packet for which the L2 switching has been performed to generate a new tunnel packet, and transmitting the new tunnel packet.

According to another embodiment of the present invention, there is provided a network virtualization method including generating at least two network virtualization domains consisting of a domain tunnel end point and at least one edge tunnel end point; and connecting domain tunnel end points of each of the network virtualization domain with L3 tunnels in full-mesh topology, wherein the domain tunnel end point and the at least one edge tunnel end point are connected based on the L3 tunnel.

As aforementioned, by using a method and apparatus for multi-domain network virtualization according to embodiments of the present invention, it is possible to provide expandability in an overlay-based virtual network configured by an L3 tunnel. According to an embodiment of the present invention, by creating a plurality of network virtualization domains of an appropriate size that may be created in a full-mesh tunnel manner, and then having a domain tunnel end point in every domain, and then simply adding a full-mesh connection between domain tunnel end points, it is possible to create one large scale network virtualization domain where a plurality of domains are integrated. In this way, the number of tunnels necessary in a network virtualization domain may be significantly reduced, and thus a large scale network virtualization domain may be constructed.

BRIEF DESCRIPTION OF THE DRAWINGS

The above and other features and advantages of the present invention will become more apparent to those of ordinary skill in the art by describing in detail embodiments with reference to the attached drawings in which.

DETAILED DESCRIPTION

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Figure 1:
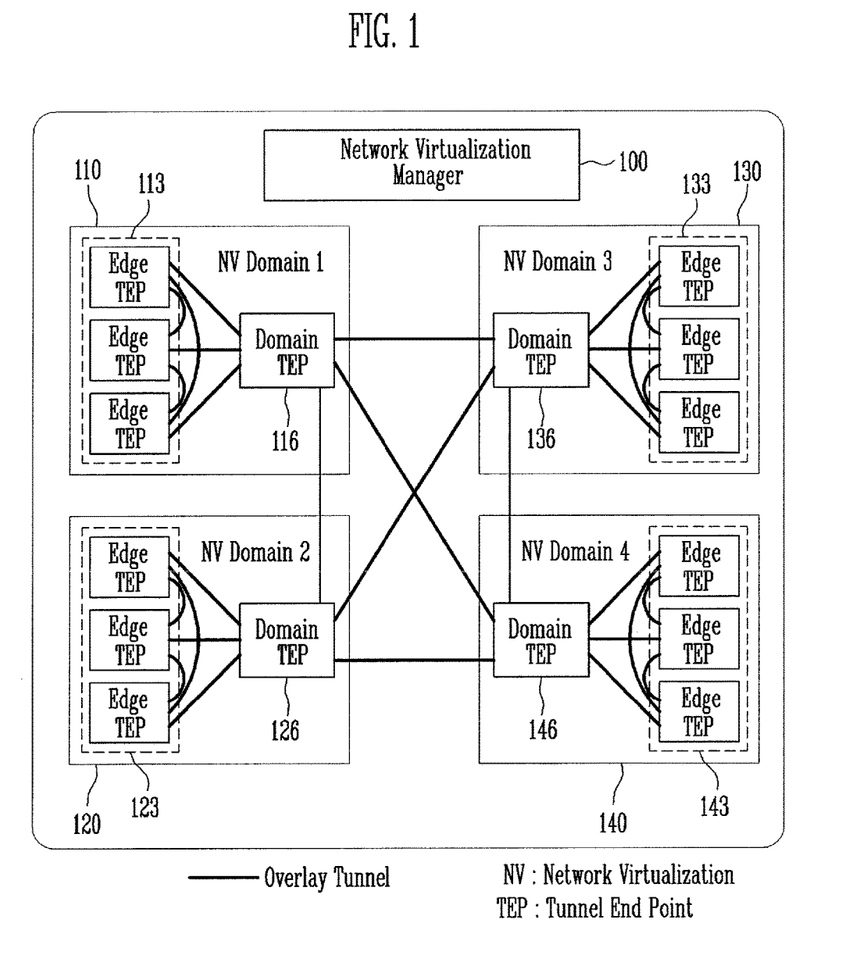
FIG. 1 is a conceptual view illustrating a network virtualization method according to an embodiment of the present invention.

FIG. 1 is a conceptual view illustrating a network virtualization method according to an embodiment of the present invention.

FIG. 1 illustrates a method for connecting a plurality of network virtualization domains 110, 120, 130, and 140 having appropriate sizes that may be realized in an overlay L3 tunnel method so as to make one high rank network virtualization domain.

Referring to FIG. 1, the plurality of network virtualization domains 110, 120, 130, and 140 may be connected to one another. Each of the network virtualization domains 110, 120, 130, and 140 may include a plurality of edge tunnel end points 113, 123, 133, and 143, and at least one domain tunnel end point 116, 126, 136, and 146. A network virtualization manager 100 may be configured to set and manage an edge tunnel end point and domain tunnel end point for each network virtualization domain. A multi-domain network virtualization may be performed based on the network virtualization manager 100 according to an embodiment of the present invention. Specifically, the network virtualization manager (or network virtualization apparatus) may set each network virtualization domain based on a processor to perform a multi-domain network virtualization.

Edge tunnel end points 113, 123, 133, and 143 are servers having virtual machines or gateways that connect legacy networks to virtualized network. Edge tunnel end points 113, 123, 133, and 143 may instruct a tunnel end point in a conventional overlay-based network virtualization method. For example, in a VXLAN, a VTEP (VXLAN Tunnel End Point) may be an edge tunnel end point 113, 123, 133, and 143. In one network virtualization domain, the edge tunnel end points 113, 123, 133, and 143 may be connected to one another with an unicast tunnel in full-mesh topology.

According to an embodiment of the present invention, a domain tunnel end point 116, 126, 136, and 146 may be realized in each of the network domains 110, 120, 130, and 140 having an appropriate size, thereby virtualizing a network. Each of the domain tunnel end points 116, 126, 136, and 146 may be connected to all the edge tunnel end points 113, 123, 133, and 143 by a tunnel. Furthermore, between the domain tunnel end points 116, 126, 136, and 146 of each of the network virtualization domains 110, 120, 130, and 140, an L3 tunnel may be set in full-mesh topology.

Each tunnel has a same structure, and in a tunneled packet structure, there may exist a packet being transmitted from an edge tunnel end point to an edge tunnel end point, a packet being transmitted from an edge tunnel end point to a domain tunnel end point, and a packet being transmitted from a domain tunnel end point to a domain tunnel end point. Hereinafter, FIG. 2 illustrates a packet being transmitted from each end point.

Figure 2A:
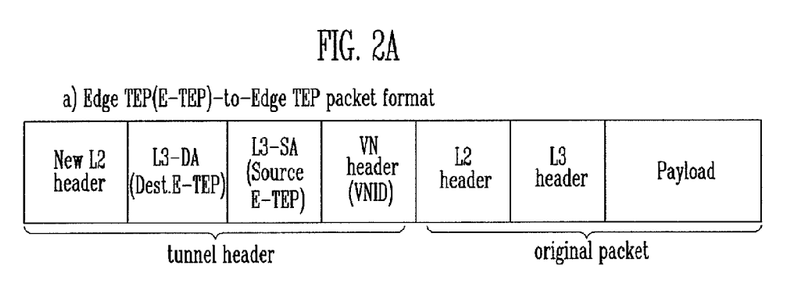
FIGS. 2a, 2b, and 2c are conceptual views illustrating a packet according to an embodiment of the present invention.
Figure 2B:
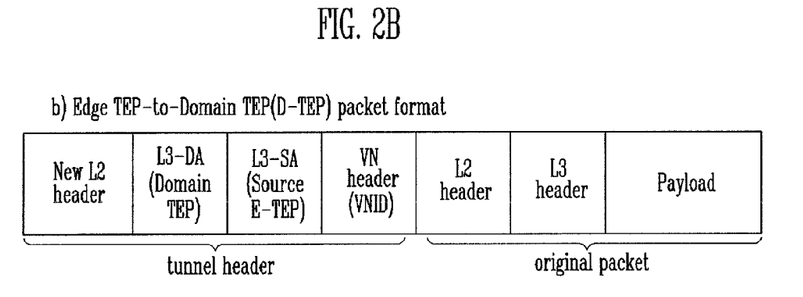
Figure 2C:
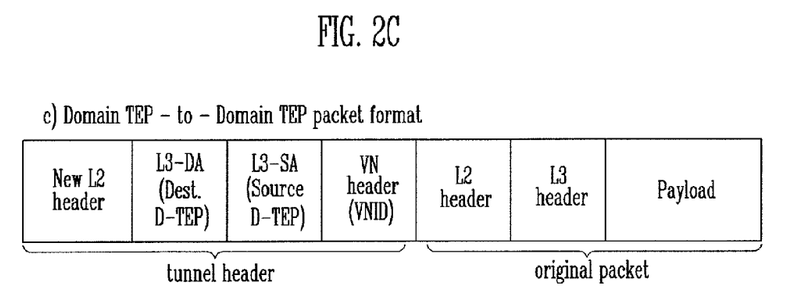

FIGS. 2a, 2b, and 2c are conceptual views illustrating a packet according to an embodiment of the present invention.

(a) of FIG. 2 indicates a packet being transmitted from an edge tunnel end point to another edge tunnel end point, (b) of FIG. 2 indicates a packet being transmitted from an edge tunnel end point to a domain tunnel end point, and (c) of FIG. 2 indicates a packet being transmitted from a domain tunnel end point to another domain tunnel end point.

Referring to FIG. 2, all tunnel packets may include an original packet and a tunnel header. The original packet may include an L2 header caused by an L2 layer, an L3 header caused by an L3 layer, and payload for containing data being transmitted.

The tunnel header may include a VN header for containing a VNID (Virtual Network Identifier) meaning a virtual network where a packet belongs to. The tunnel header may include an L3 tunnel header in front of the VN header. The L3 tunnel header may include an L3 DA (destination address) header and an L3 SA (source address) header.

Referring to (a) of FIG. 2, in the case of a packet between edge tunnel end points, the L3 SA header may include an L3 address of an edge tunnel end point that transmits the original packet, and the L3 DA header may include an L3 address of an edge tunnel end point that receives the original packet. That is, the L3 DA header may include the L3 address of a destination edge tunnel end point connected to an actual destination host of the original packet.

Referring to (b) of FIG. 2, in the case of a packet heading from an edge tunnel end point towards a domain tunnel end point, an L3 SA header may include an L3 address of an edge tunnel end point that transmits the packet, and an L3

DA header may include an L3 address of a domain tunnel end point to which the packet is being transmitted.

Referring to (c) of FIG. 2, in the case of a packet being transmitted between domain tunnel end points, an L3 SA header of the packet may include an L3 address of a domain tunnel end point that transmits the packet, and an L3 DA header may include an L3 address of a domain tunnel end point corresponding to a destination of the packet.

There may be a case where a packet is transmitted from an edge tunnel end point included in a certain network virtualization domain to a domain tunnel end point, and the packet is then transmitted to a domain tunnel end point of another virtualization network domain. In such a case, according to an embodiment of the present invention, the L3 tunnel header of the packet may be changed from (b) of FIG. 2 to (c) of FIG. 2 while going through the domain tunnel end point.

According to an embodiment of the present invention, instead of being connected with all edge tunnel end points belonging to other domains with a tunnel in full-mesh topology, an edge tunnel end point may be connected with a domain tunnel end point by only one tunnel, and thus logically operate as if it is connected to all the edge tunnel end points belonging to other domains with a tunnel in full-mesh topology. That is, according to an embodiment of the present invention, each domain tunnel end point included in a virtual network domain may be configured to perform like a tunnel switch which can relay the single-hop tunnel packet from each each tunnel end point to any other tunnel end points not reachable by single-hop tunnel.

Figure 3:
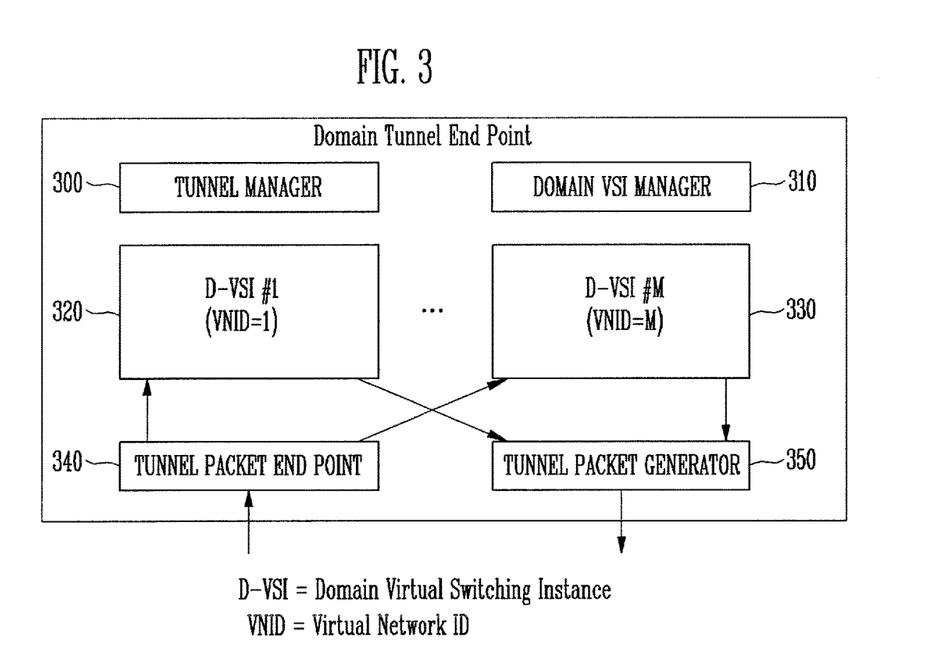
FIG. 3 is a conceptual view illustrating a domain tunnel end point according to an embodiment of the present invention.

FIG. 3 is a conceptual view illustrating a domain tunnel end point according to an embodiment of the present invention.

Referring to FIG. 3, a domain tunnel end point may include a tunnel manager 300, domain VSI (Domain Virtual Switching Instance) manager 310, a plurality of domain VSIs 320, 330, tunnel packet end point 340, and tunnel packet generator 350.

The tunnel manager 300 may be configured to connect a tunnel between all edge tunnel end points and a domain tunnel end point within a network domain, and between another domain tunnel end point and a corresponding domain tunnel end point. The tunnel manager 300 receive information on all the edge tunnel end points within the domain and information on another domain tunnel end point transmitted by an operator's setting or a protocol.

Furthermore, the tunnel manager 300 may connect an individual tunnel between each edge tunnel end point within the domain based on the received edge tunnel end point information and domain tunnel end point information, and also connect a tunnel in full-mesh topology between another domain tunnel end point as well. Tunnels between end points may be configured in various ways. For example, one tunnel may be created between two tunnel end points, and packets belonging to all VNID may be transmitted through that one tunnel. Alternatively, a plurality of tunnels may be created for each VNID between two tunnel end points, and packets may be transmitted through the plurality of tunnels.

In the case where the end point of the tunnel created is an edge tunnel end point, the tunnel manager 300 may create in each domain VSI 320, 330 an edge virtual port associated with a corresponding edge tunnel end point. In the case were the end point of the tunnel created is a domain tunnel end point, the tunnel manager 300 may create in each domain VSI 320, 330 a domain virtual port associated with the corresponding domain tunnel end point. According to an embodiment of the present invention, the virtual port may be created in the domain VSI 320, 330 corresponding to each VNID belonging to an tunnel end point, or created in all domain VSIs 320, 330 within the domain tunnel end point.

The domain VSI manager 310 may receive a virtual network identifier transmitted from outside and create a domain VSI corresponding to the VNID received. When the network virtualization manager that manages the entire network virtualization want to create a virtual network, the network virtualization manager may transmit information on the VNID (virtual network identifier) of the virtual network should be created to corresponding domain tunnel end point. The domain VSI manager 320 according to an embodiment of the present invention receives the VNID and creates a domain VSI corresponding thereto.

The domain VSI 320, 330 may exist for each VNID. The domain VSI 320, 330 may perform a switching according to a modified L2 switching rule applied to the domain VSI 320, 330 based on an original L2 header of the received packet and transmit the packet to a destination virtual port associated with a destination tunnel end point. That is, in the case where the original destination host is in another network virtualization domain, in the domain VSI 320, 330, the packet may be output to a virtual port associated with the domain tunnel end point of the network virtualization domain where the original destination host exists based on the switching and transmit the packet to the tunnel packet generator 350. Furthermore, in the case where the destination host is in a same virtualization domain, in the domain VSI 320, 330, L2 switching may be performed and the packet may be output to a virtual port associated to the edge tunnel end point where the destination host belongs to, and the packet may be transmitted to the tunnel packet generator 350.

The tunnel packet end point 340 may obtain information on the VNID and the L3 address of a sending tunnel end point from the tunnel header of the input packet. The tunnel packet end point 340 may transmit the packet to the domain VSI corresponding to the VNID of the packet.

The tunnel packet generator 350 may find the VNID from the domain VSI information of the received packet and include a VN header to the received packet. Specifically, the tunnel packet generator 350 may find an L3 address of the destination tunnel end point from the domain VSI output virtual port information, create a tunnel L3 header, attach the generated header and complete a new tunnel packet, and transmit the new tunnel packet to another virtual network domain.

Figure 4:
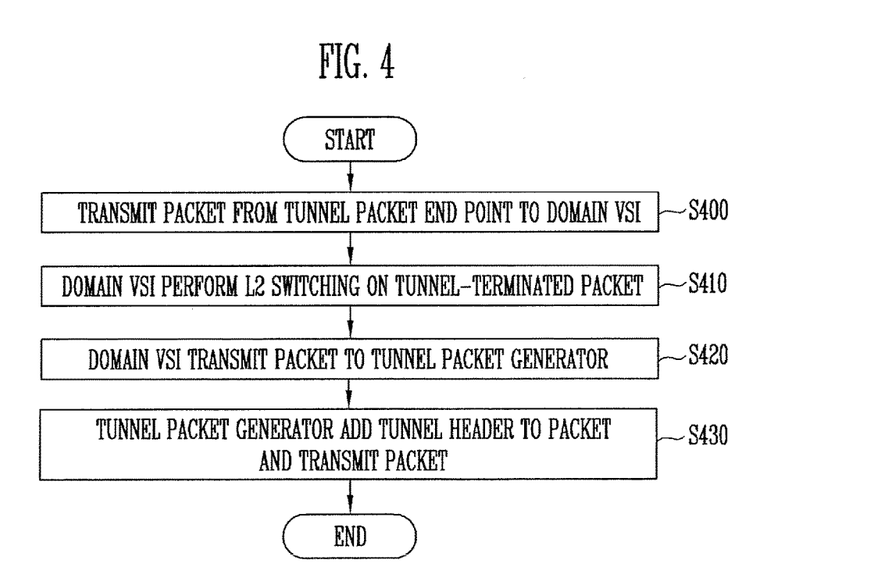
FIG. 4 is a flowchart illustrating a packet processing procedure in a domain tunnel end point according to an embodiment of the present invention.

FIG. 4 is a flowchart illustrating a packet processing procedure in a domain tunnel end point according to an embodiment of the present invention.

Referring to FIG. 4, a packet is transmitted from a tunnel packet end point to a domain VSI (S400).

The tunnel packet end point may obtain information an L3 address of a tunnel end point and information on an VNID corresponding to the packet from a tunnel header of the tunnel packet received. The tunnel packet end point may modify the packet such that an L2 switching may be performed based on the L2 header of the packet in the domain VSI. The tunnel packet end point may transmit the modified packet to the domain VSI associated with the VNID. Herein, the packet may be input to the virtual port, 1:1 mapped to the L3 source address of the tunnel packet.

The domain VSI performs an L2 switching on the packet (S410).

The domain VSI may perform a modified L2 switching based on the L2 header included in the packet. In the domain VSI, the packet processing based on the L2 switching may be performed based on the L2 source address and the L2 destination address of the packet. The method of performing the L2 switching on the packet in the domain VSI will be explained in detail hereinafter.

The domain VSI transmits the packet to a tunnel packet generator (S420).

The packet is transmitted to the tunnel packet generator to be transmitted to the edge tunnel end point within the corresponding domain or to the domain tunnel end point of another virtual network domain according to the destination virtual port.

The tunnel packet generator adds a tunnel header to the packet and transmits the packet (S430).

The packet switched in the domain VSI may be added with a tunnel header in the tunnel packet generator and then be transmitted outside. The VN header of the tunnel header being added to the packet may be generated based on the VNID of the domain VSI that switched the packet. Furthermore, the L3 SA header of the tunnel header generated in the tunnel packet generator may include an address of the current domain tunnel end point, and the L3 DA header of the tunnel header may include another domain tunnel end point obtained from the domain VSI output virtual port information of the packet, or an address of the destination edge tunnel end point within the same domain.

Figure 5:
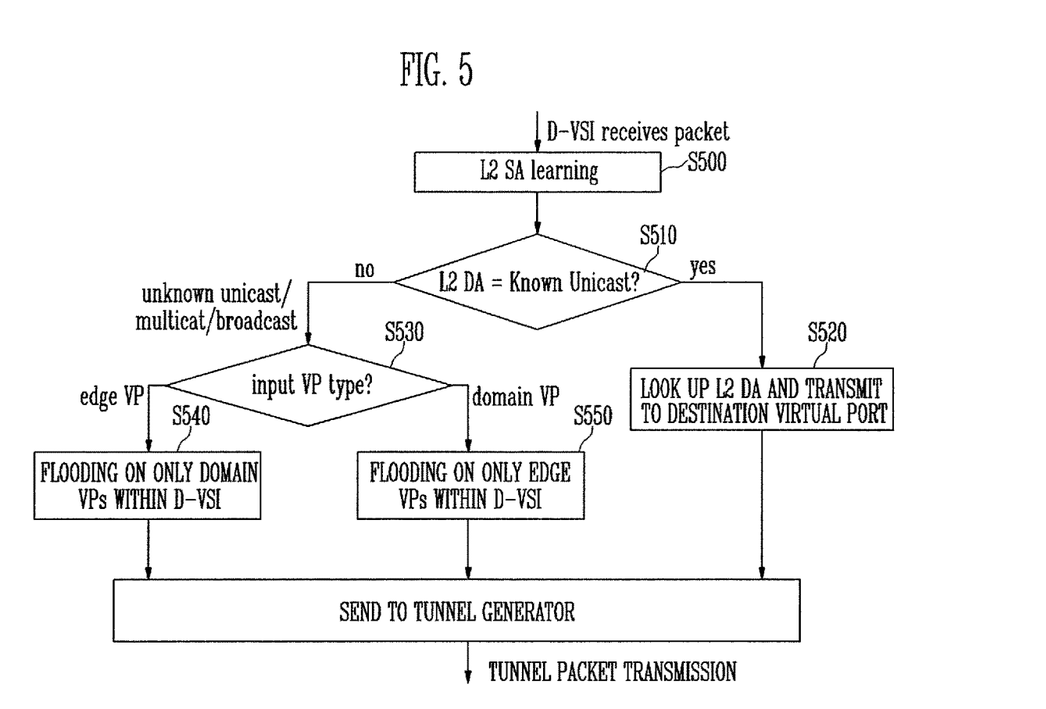
FIG. 5 is a flowchart illustrating an L2 switching performed in a domain VSI according to an embodiment of the present invention.

FIG. 5 is a flowchart illustrating a L2 switching performed in the domain VSI according to an embodiment of the present invention.

Referring to FIG. 5, the domain VSI obtains information on the L2 SA of the packet input (S500).

The domain VSI determines whether or not the L2 DA of the packet input is a unicast address already known (S510).

In the case where the L2 DA is a unicast address already learned in the domain VSI, the domain VSI may find a corresponding virtual port and transmit the packet to the corresponding virtual port (S520).

On the other hand, in the case where the destination L2 address is an unknown unicast address, or the destination L2 indicates a multicast or broadcast, a changed flooding method may be determined according to a type of the input virtual port (S530).

In the case where the type of the input virtual port is an edge virtual port, flooding is performed on only all the domain virtual ports within the domain VSI (S540).

In the case where the type of the input virtual port is a domain virtual port, flooding is performed on only all the edge virtual ports within the domain VSI (S550).

Figure 6A:
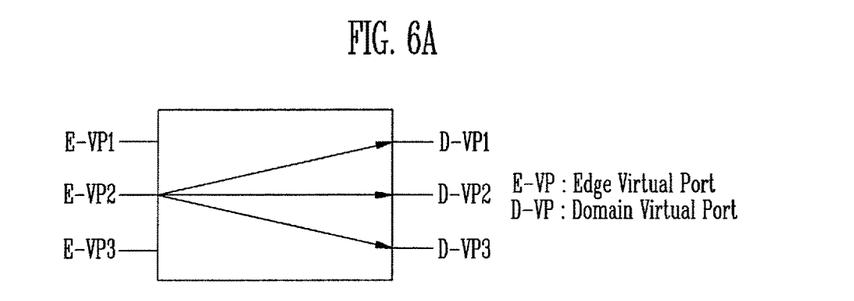
FIGS. 6a and 6b are conceptual views illustrating a flooding in a domain VSI according to an embodiment of the present invention.
Figure 6B:
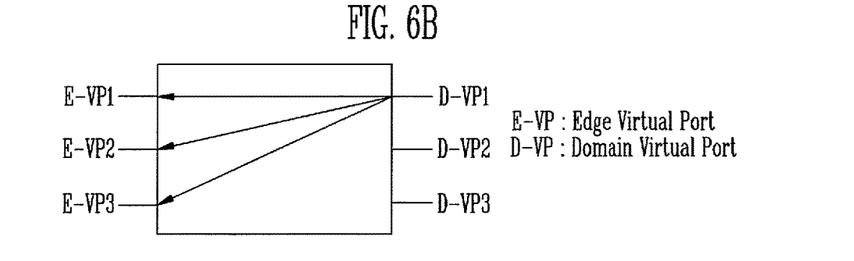

FIGS. 6a and 6b are conceptual views illustrating flooding in a domain VSI according to an embodiment of the present invention.

Referring to FIGS. 6a and 6b, if the type of the input virtual port is an edge virtual port, packet is flooded to only domain virtual ports. On the other hand, if the type of the input virtual port is a domain virtual port, packet is flooded to only edge virtual ports. Such a modified flooding rule may be used to prevent generation of a forwarding loop by flooding.

As aforementioned, by using a method and apparatus for multi-domain network virtualization according to embodiments of the present invention, it is possible to provide expandability in an overlay-based virtual network using L3 tunnel. According to an embodiment of the present invention, by creating a plurality of network virtualization domains of an appropriate size that may be created in a full-mesh tunnel manner, and then having a domain tunnel end point in every domain, and then simply adding a full-mesh connection between domain tunnel end points, it is possible to create one large scale network virtualization domain where a plurality of domains are integrated. In this way, the number of tunnels necessary in a network virtualization domain may be significantly reduced, and thus a large scale network virtualization domain may be constructed.

In the drawings and specification, there have been disclosed typical embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A network virtualization apparatus comprising:
a tunnel manager configured to collect tunnel end point information within a network, and to connect each tunnel end point with a tunnel based on the tunnel end point information collected;
a tunnel packet end point configured to receive a tunnel packet and process the packet such that an L2 switching may be performed, and to transmit the packet to a domain VSI (virtual switching instance);
the domain VSI configured to perform the L2 switching on the processed packet, and to transmit the packet to a tunnel packet generator; and
the tunnel packet generator configured to add a tunnel header to the packet for which the L2 switching has been performed to generate a new tunnel packet, and to transmit the new tunnel packet.

2. The apparatus according to claim 1,
wherein the domain VSI, when perform the L2 switching,
obtains L2 SA (source address) information for the processed packet,
determines whether or not L2 DA (destination address) information of the processed packet is a unicast address already learned, and
performs a flooding based on a type of an input virtual port, when the L2 DA information is not already learned unicast address, or is multicast or broadcast address;
wherein the flooding is performed on only domain virtual ports within the domain VSI, when the type of the input virtual port being an edge virtual port, and the flooding is performed on only edge virtual ports within the domain VSI when the type of the input virtual port being a domain virtual port.

3. The apparatus according to claim 2,
wherein, the domain VSI, when performing the L2 switching,
in response to the L2 DA information being a unicast address already learned, transmits the processed packet to a destination virtual port corresponding to the unicast address, and obtains an L3 address of a destination tunnel end point of the packet from the destination virtual port.

4. The apparatus according to claim 1,
wherein the tunnel packet end point obtains a VNID (Virtual Network ID) of the tunnel packet and L3 address information of a sending tunnel end point from the tunnel header of the tunnel packet,
processes the tunnel packet such that the L2 switching may be performed, and transmits the processed packet to the domain VSI corresponding to the VNID through a virtual port associated with the sending tunnel end point.

5. The apparatus according to claim 1,
wherein the tunnel packet generator is configured, for the packet for which the L2 switching has been performed, to generate a VN header (virtual network header) including a VNID (Virtual Network ID) corresponding to the domain VSI and a L3 tunnel header based on a destination tunnel end point L3 address obtained from a destination virtual port of the packet for which the L2 switching has been performed, and to combine the VN header and the L3 tunnel header with the processed packet for which the L2 switching has been performed, and transmit the same.

6. The apparatus according to claim 1,
further comprising a domain VSI manager configured to receive a VNID (virtual network ID) of a virtual network from a network virtualization manager that manages network virtualization of an entire network, and to generate the domain VSI (domain virtual switching instance) corresponding thereto.

7. An operating method of a network virtualization apparatus, the method comprising:
collecting tunnel end point information within a network virtualization domain, and connecting each tunnel end point with a tunnel based on the tunnel end point information collected;
receiving a tunnel packet and processing the packet such that a L2 switching may be performed;
performing the L2 switching on the processed packet;
adding a tunnel header to the packet for which the L2 switching has been performed to generate a new tunnel packet, and transmitting the new tunnel packet; and
connecting tunnel end points within the network virtualization domain to other, tunnel end points within another network virtualization network domain with a unicast tunnel using the new tunnel packet.

8. The method according to claim 7,
wherein the performing the L2 switching comprises:
obtaining L2 SA (source address) information for the processed packet such that the L2 switching may be performed;
determining whether or not L2 DA (destination address) information of the processed packet is a unicast address already learned; and
performing a flooding based on a type of a input virtual port, when the L2 DA information is not the unicast address already learned, or indicates multicast or broadcast address,
wherein the flooding is performed on only domain virtual ports within a domain VSI when the type of the input virtual port being an edge virtual port, and the flooding is performed on only edge virtual ports within the domain VSI when the type of the input virtual port being a domain virtual port.

9. The method according to claim 8,
wherein the determining whether or not the L2 DA (destination address) information of the processed packet is a unicast address already learned further comprises:

in response to the L2 DA information being the unicast address already learned, transmitting the processed packet to a destination virtual port corresponding to the unicast address, and obtaining the L3 address of destination tunnel end point of the packet from the destination virtual port.

10. The method according to claim 7,
wherein the receiving the tunnel packet and processing the packet such that the L2 switching may be performed comprises:
obtaining a VNID (Virtual Network ID) of the tunnel packet and L3 address information of a sending tunnel end point from the tunnel header of the tunnel packet;
processing the tunnel packet such that the L2 switching may be performed; and
transmitting the processed packet to the domain VSI corresponding to the VNID through a virtual port associated with the sending tunnel end point.

11. The method according to claim 7,
wherein the adding a tunnel header to the packet for which the L2 switching has been performed to generate a new tunnel packet, and transmitting the new tunnel packet comprises:
generating, for the packet for which the L2 switching has been performed, a VN header (Virtual Network Header) including a VNID (Virtual Network ID) corresponding to a domain VSI, and an L3 tunnel header based on a destination tunnel end point L3 address obtained from a destination virtual port of the packet for which the L2 switching has been performed; and
combining the VN header and the L3 tunnel header with the packet for which the L2 switching has been performed, and transmitting the same.

12. The method according to claim 7,
prior to collecting tunnel end points information within a network, and connecting each tunnel end point with a tunnel based on the tunnel end point information collected,
further comprising receiving a VNID (Virtual Network ID) of the virtual network from a network virtualization manager that manages network virtualization of an entire network and generating a domain VSI (Domain Virtual Switching Instance) corresponding thereto.

13. A network virtualization apparatus comprising:
a tunnel manager configured to collect tunnel end point information within a network, and to connect each tunnel end point with a tunnel based on the tunnel end point information collected;
a tunnel packet end point configured to receive a tunnel packet and process the packet such that an L2 switching may be performed, and to transmit the packet to a domain VSI (virtual switching instance);
the domain VSI configured to perform the L2 switching on the processed packet, and to transmit the packet to a tunnel packet generator; and
the tunnel packet generator configured to add a tunnel header to the packet for which the L2 switching has been performed to generate a new unicast tunnel packet, and to transmit the new unicast tunnel packet.

* * * * *